US010056621B2

(12) United States Patent
Xu et al.

(10) Patent No.: US 10,056,621 B2
(45) Date of Patent: Aug. 21, 2018

(54) PEROVSKITE STRUCTURE FOR FUEL CELL

(71) Applicant: Ceres Intellectual Property Company Limited, Horsham (GB)

(72) Inventors: Wen Xu, Liverpool (GB); Felix Shin, Liverpool (GB); Matthew Rosseinsky, Liverpool (GB); John Claridge, Liverpool (GB)

(73) Assignee: CERES INTELLECTUAL PROPERTY COMPANY LIMITED, West Sussex (GB)

( * ) Notice: Subject to any disclaimer, the term of this patent is extended or adjusted under 35 U.S.C. 154(b) by 207 days.

(21) Appl. No.: 14/582,271

(22) Filed: Dec. 24, 2014

(65) Prior Publication Data
US 2016/0329570 A1 Nov. 10, 2016

(30) Foreign Application Priority Data

Nov. 27, 2014 (GB) .................................. 1421069.4

(51) Int. Cl.
| | |
|---|---|
| *H01M 4/00* | (2006.01) |
| *H01M 4/90* | (2006.01) |
| *C01G 51/00* | (2006.01) |
| *H01M 4/88* | (2006.01) |
| *H01M 8/1246* | (2016.01) |
| *H01M 8/2425* | (2016.01) |
| *H01M 8/124* | (2016.01) |

(52) U.S. Cl.
CPC .......... *H01M 4/9033* (2013.01); *C01G 51/66* (2013.01); *C01G 51/68* (2013.01); *C01G 51/70* (2013.01); *H01M 4/8885* (2013.01); *H01M 8/1246* (2013.01); *H01M 8/2425* (2013.01); *C01P 2002/34* (2013.01); *C01P 2002/72* (2013.01); *C01P 2004/04* (2013.01); *C01P 2006/40* (2013.01); *H01M 2008/1293* (2013.01)

(58) Field of Classification Search
CPC ............. H01M 8/2425; H01M 4/8885; H01M 4/9033; C01F 11/02; C01F 17/0012; C01G 41/006; C01G 49/009; C01G 51/006; C01G 51/66; C01G 51/68; C01G 51/70
USPC ....... 429/452, 489, 408; 423/594.2; 501/123
See application file for complete search history.

(56) References Cited

U.S. PATENT DOCUMENTS

| | | | | |
|---|---|---|---|---|
| 2004/0081893 | A1* | 4/2004 | Hansen | C04B 35/50 429/321 |
| 2005/0266297 | A1* | 12/2005 | Irvine | B01D 53/228 429/425 |
| 2011/0086289 | A1* | 4/2011 | Venkataraman | H01M 8/1246 429/495 |
| 2013/0295484 | A1 | 11/2013 | Seo et al. | |

FOREIGN PATENT DOCUMENTS

| | | | |
|---|---|---|---|
| CN | 104078687 | * | 10/2014 |
| CN | 104078687 A | | 10/2014 |

OTHER PUBLICATIONS

Demont, et al., "Single sublattice endotaxial phase separation driven by charge frustration in a complex oxide" Journal of the American Chemical Society, 2013, 135, pp. 10114-10123.*
Popov, et al., "Improvement of . . . functional properties by partial substitution of cobalt with tungsten" Journal of Membrane Science, 469, Jun. 2014, pp. 88-94.*
Savinskaya, O.A. et al., Synthesis and study of the thermal stability of SrFe1-xM xO3-z (M=Mo, W) perovskites, Solid State Ionics, Sep. 15, 2008, pp. 1076-1079, vol. 179, No. 21-26, North Holland Pub. Company, Amsterdam, NL.
Fang, S.M. et al., Performance and stability of niobium-substituted Ba0.5Sr0.5Co0.8Fe0.2O3-δ membranes, Solid State Ionics, May 31, 2011, pp. 1-6, vol. 195, No. 1, North Holland Pub. Company, Amsterdam, NL.
Demont, A. et al., Single Sublattice Endotaxial Phase Separation Driven by Charge Frustration in a Complex Oxide, Journal of the American Chemical Society, Jun. 10, 2013, pp. 10114-10123, vol. 135, No. 27.
Popov, M.P. et al., Improvement of Ba0.5sr0.5Co0.8Fe0.2O3-δ functional properties by partial substitution of cobalt with tungsten, Journal of Membrane Science, Jun. 24, 2014, pp. 88-94, vol. 469.
Search Report dated May 21, 2015 in corresponding GB Application No. 1421069.4.
Examination Report dated Jul. 7, 2015 in corresponding GB Application No. 1421069.4.
International Search Report dated Jan. 29, 2016 in corresponding International Application No. PCT/GB2015/053400.
Written Opinion dated Ja. 29, 2016 in corresponding International Application No. PCT/GB2015/053400.
Examination Report dated Aug. 25, 2016 in corresponding GB Application No. 1421069.4.
Examination Report dated Mar. 13, 2017 in corresponding GB Application No. 1421069.4.
International Preliminary Report on Patentability dated May 30, 2017 in corresponding International Application No. PCT/GB2015/053400.

* cited by examiner

*Primary Examiner* — Steven J Bos
(74) *Attorney, Agent, or Firm* — Snell & Wilmer L.L.P.

(57) ABSTRACT

Perovskite structures are provided for use in fuel cells. Specifically, perovskite structures are provided for use as electrodes in solid oxide fuel cells (SOFCs) and methods of making the same. The perovskite structure may include a first element X, strontium, iron, cobalt, oxygen and tungsten; wherein the first element X is barium, a lanthanide, or a mixture thereof, and wherein the structure comprises a region of single perovskite and a region of double perovskite.

21 Claims, 17 Drawing Sheets

TABLE 1

| Weight Fraction / % | | Atom | Multiplicity | x, y, z | Occupancy | $B_{iso}(Å^2)$ |
|---|---|---|---|---|---|---|
| DP | 78.1 | Ba | 8c | 0.25, 0.25, 0.25 | 0.5 | 0.94(1) |
| | | Sr | 8c | 0.25, 0.25, 0.25 | 0.5 | 0.94(1) |
| | | Fe1 | 4b | 0.5, 0.5, 0.5 | 0.123(6) | 0.74(2) |
| | | W1 | 4b | 0.5, 0.5, 0.5 | 0.877(9) | 0.74(2) |
| | | Fe2 | 4a | 0, 0, 0 | 0.088(5) | 0.61(4) |
| | | Co2 | 4a | 0, 0, 0 | 0.912(6) | 0.61(4) |
| | | O | 24e | 0.259(1), 0, 0 | 1 | 1.12(1) |
| SP | 21.9 | Ba | 1a | 0, 0, 0 | 0.5 | 2.33(6) |
| | | Sr | 1a | 0, 0, 0 | 0.5 | 2.33(6) |
| | | Fe | 1b | 0.5, 0.5, 0.5 | 0.412(7) | 1.53(6) |
| | | Co | 1b | 0.5, 0.5, 0.5 | 0.588(9) | 1.53(6) |
| | | O | 3c | 0.5, 0.5, 0 | 0.753(6) | 2.08(6) |

FIG. 17

PEROVSKITE STRUCTURE FOR FUEL CELL

FIELD OF INVENTION

The invention relates to structures for use in fuel cells. Specifically, perovskite structures for use as electrodes in solid oxide fuel cells (SOFCs) and methods of making the same.

BACKGROUND

A SOFC is an electrochemical device for the generation of electrical energy through the electrochemical oxidation of a fuel gas (usually hydrogen-based). The device is generally ceramic-based, using an oxygen-ion conducting metal-oxide derived ceramic as its electrolyte. As most ceramic oxygen ion conductors (for instance, doped zirconium oxide or doped cerium oxide) only demonstrate technologically relevant ion conductivities at temperatures in excess of 500° C. (for cerium-oxide based electrolytes) or 650° C. (for zirconium oxide based ceramics), SOFCs operate at elevated temperatures.

In common with other fuel cells, SOFCs include an anode where fuel is oxidised, and a cathode where oxygen is reduced. These electrodes must be capable of catalysing the electrochemical reactions, be stable in their respective atmospheres at the temperature of operation (reducing on the anode side, oxidising on the cathode side), and be able to conduct electrons so the electric current generated by the electrochemical reactions can be drawn away from the electrode-electrolyte interface.

Various materials have been explored for use as cathodes in SOFCs including perovskite cobalt crystals. Barium and lanthanide containing materials such as BSCF and LSCF (barium/lanthanum, strontium and iron containing cobalt oxides) are examples of such materials and perform well as SOFC cathodes due to their high oxygen ion conductivity and area specific resistance (ASR).

However, many such materials (such as conventional (undoped) BSCF) suffer significantly from poor thermal and chemical stability. BSCF in particular reacts with various electrolyte materials while sintering (at ≥900° C. with cerium oxide based electrolytes, the most common electrolyte type with BSCF in terms of SOFC operating temperatures) and undergoes a phase transition from cubic to hexagonal polymorph at ≤900° C. (which is the typical operating temperature for the material) detrimental to its transport and catalytic properties and so increasing ASR over time, thus eliminating it from the practical use in SOFC applications.

Therefore, it is desirable to develop materials which have a comparable or lower ASR to BSCF and LSCF in low and intermediate temperature applications; yet which are more stable and, in particular, which exhibit reduced phase transition and hence have the ability to maintain lower ASR over time.

Some work has been done to augment the properties of these materials in order to improve oxygen ion conductivity, increase thermal stability and enhance resistance to degradation. For instance, heavy doping of BSCF with molybdenum has been found to improve conductivity and also improve the stability of the material whilst keeping the ASR values comparable to that of BSCF.

Unfortunately, many doped materials when used in SOFCs suffer a "leeching" phenomenon where the dopant comes out of the cathode material (e.g. to form (Ba/Sr) $MoO_4$) and the performance of the cathode diminishes. Further, if too much of the dopant is allowed to leech out of the cathode material, then structural rearrangements can occur within crystal structures which can cause the electrode materials to fracture and decrease performance Demont, A., et al., "Single Sublattice Endotaxial Phase Separation Driven by Charge Frustration in a Complex Oxide", J. Am. Chem. Soc., 2013, 135, p. 10114-10123 discloses the use of molybdenum as a dopant material for making perovskite structures.

It is therefore also desirable to develop perovskite crystals and ceramics which not only demonstrate improved performance over conventional materials but that also resist leeching of dopants under SOFC operating conditions.

The invention is intended to solve or at least ameliorate some of the problems outlined above.

SUMMARY OF INVENTION

Objects and advantages of the invention will be set forth in part in the following description, or may be obvious from the description, or may be learned through practice of the invention.

There is provided in a first aspect of the invention, a perovskite structure comprising: a first element X, strontium, iron, cobalt, oxygen and tungsten; wherein the first element X is barium and/or a lanthanide and wherein the structure comprises a region of single perovskite (SP) and a region of double perovskite (DP). A fuel cell comprising such a perovskite structure is also provided in one embodiment, along with a fuel cell stack comprising one of more fuel cells.

Methods are also provided for forming a perovskite structure. In one embodiment, the method comprises: mixing starting materials, wherein the starting materials comprise a first element X, strontium, iron, cobalt, oxygen and tungsten to form a mixture; heating the mixture to a first temperature for a first period of time to form a single perovskite; and heating the mixture to a second temperature for a second period of time to form a double perovskite; wherein the first element X is barium, a lanthanide, or a mixture thereof.

The invention will now be described with reference to accompanying figures and examples.

DESCRIPTION OF FIGURES

FIG. 17 shows Table 1 as an example of the composition and arrangement of atoms and regions of a $Ba_{0.5}Sr_{0.5}(Co_{0.7}Fe_{0.3})_{0.6875}W_{0.3125}O_3$ perovskite structure.

DETAILED DESCRIPTION

Figure 1:
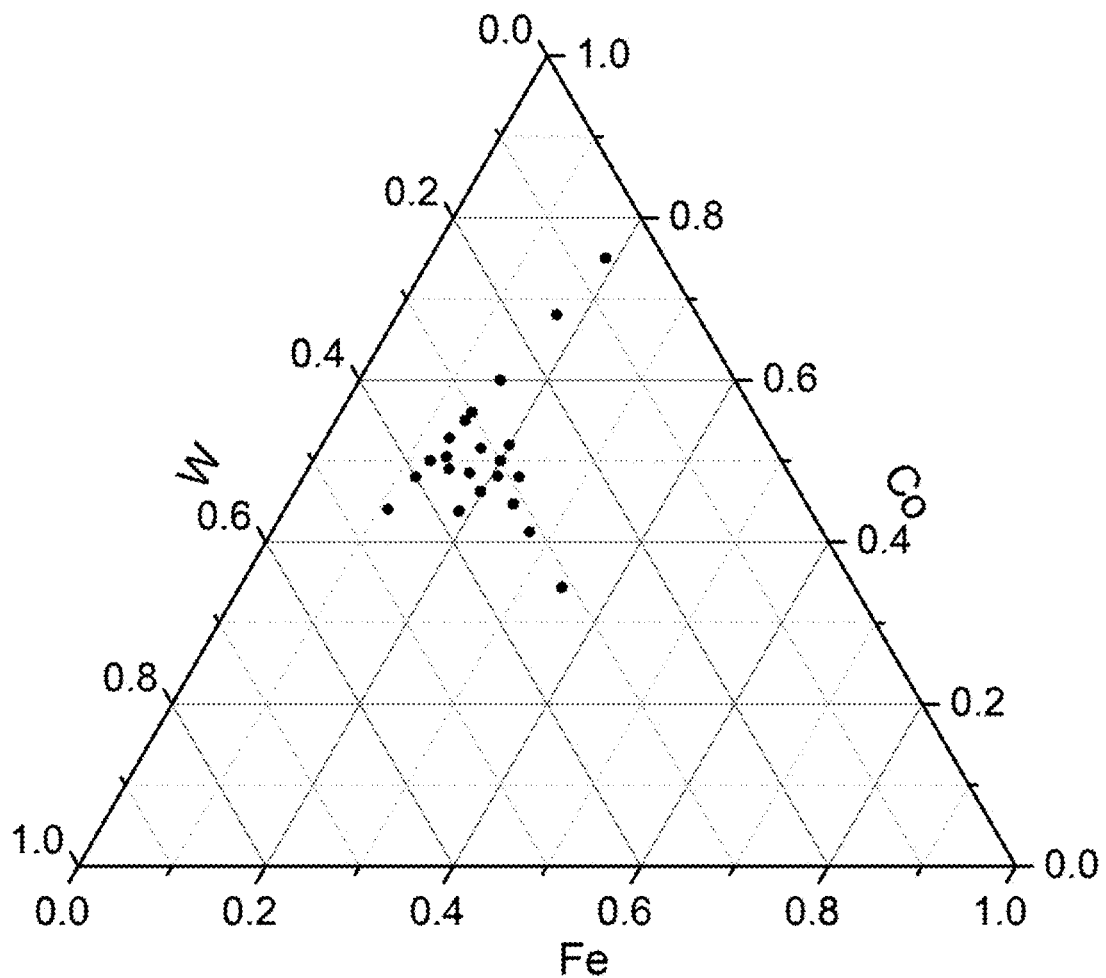
FIG. 1—shows a phase diagram for a range of compositions, the X-ray diffraction patterns of which all showed both single and double perovskite structures.

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

There is provided in a first aspect of the invention, a perovskite structure comprising: a first element X, strontium, iron, cobalt, oxygen and tungsten; wherein the first element X is barium and/or a lanthanide and wherein the structure comprises a region of single perovskite (SP) and a region of double perovskite (DP).

The inventors have surprisingly found that perovskites doped with tungsten demonstrate remarkable improvements in properties over conventional SOFC cathode materials and other doped perovskite materials.

Furthermore, it has been found that when tungsten is used as a dopant, the level of dopant leeching is greatly reduced. This results in a material which improves the performance and life time of SOFC electrodes. Without being bound by theory, it is believed that tungsten ions selectively arrange themselves within the double perovskite structures in preference over the single perovskite structures. The precise reason why this occurs is not clearly understood, but this may be responsible for the leech resistance and improved stability of the resulting material.

Further, the use of tungsten as a dopant results in a surprising improvement in oxygen content (low content of oxygen) in the SP phase. The beneficial effect of such low oxygen content of the SP phase is an enhanced oxide ion conductivity. This is well exemplified in the improved area specific resistance values of tungsten doped BSCF.

The term "dopant" as used herein is not intended to be restricted to a maximum percentage of elements, ions or compounds added to chemical structures. Similarly, the term "doping" is intended to mean the addition of a certain amount of elements, ions or compounds to a material. It is not limited to a maximum quantity of material, after which, further addition of material no longer constitutes doping.

The term "perovskite structure" as used herein refers to a single network of chemically bonded crystal structures which have a generally perovskite ($ABO_3$) structure. This does not mean that this single network need possess a single, uniform crystal structure throughout the entire structure. However, where different crystal structures occur between different regions of the network, it is often the case that these regions have complimentary structures permitting chemical bonds to more easily form there between. An example of this would be single and double perovskite crystal regions.

The term "region" as used herein with reference to the single and double perovskite regions is intended to refer to an area or portion which forms part of and is integral to the single network making up the perovskite structure. This is distinguished from areas simply being in physical contact with one another.

The first element X may be a lanthanide such as lanthanum. The addition of tungsten can augment a variety of perovskite materials each of which may use elements within this series in order to fit a specific purpose.

It is typically the case that the first element X is barium. When barium is used, together with strontium, iron, oxygen and cobalt, it forms a particularly effective SOFC cathode material and is improved greatly by the presence of tungsten.

Often, the perovskite structure according to the present invention will contain tungsten in a molar percentage of at least 5%. Doping materials such as BSCF or LSCF with quantities of dopant such as tungsten at concentrations higher than about 5% can to result in a mixed perovskite structure containing large quantities of both double perovskite and single perovskite. It is thought that the presence of dopants such as tungsten at said concentrations encourages endotaxial growth to occur which results in significant quantities of both single and double perovskite structures being formed.

As used herein, the term "endotaxial growth" is intended to mean that the formation of more than one complimentary crystal structure, for example single and double perovskite, such that they co-exist. Typically, this refers to the propagation of two complimentary crystal structures and often, this is single perovskite and double perovskite.

Perovskite structures as defined herein (having both single and double perovskite regions), such as those acquired via endotaxial growth, are advantageous because the mixture or "alloy" of regions amongst the perovskite structures improves the properties of the overall material. Without being bound by theory, it is thought that when both the double and single perovskite structures are locked together in a common perovskite structure, this allows the single perovskite to resist changes in structure due to the surrounding, interlocking double perovskite which has a more stable crystal structure.

The total concentration of tungsten may be in the range of 5-95% molar percentage, this range is intended to also encompass the following ranges: 5-90%, 5-85%, 5-80%, 5-75%, 5-70%, 5-65%, 5-60%, 5-55%, 5-45%, 5-40%, 5-35%, 5-30%, 5-25%, 5-20%, 5-15% and 5-10% of tungsten. Most typically, the amount of tungsten is in the range 5-10% molar percentage tungsten. The inventors have found this particular concentration of dopant to result in optimal perovskite structures with a good balance between stability and conductivity of the structure.

The structure of the composition according to the present invention typically has the chemical formula:

$$(Ba_{1-x}Sr_x)(Co_{1-y}Fe_y)_a W_b O_c$$

wherein, both x and y are independently in the range 0.1 to 0.9; and a+b is equal to 1. This structure is intended to be an average chemical formula for a typical perovskite material of the invention. Different regions of a typical perovskite structure will vary in composition and structure. The molar ratio of elements in this formula and corresponding values described, including the values of a, b or a+b, are not to be interpreted as exact or integer values. Defects, interstitial ions, impurities and other variations in the crystal structures occur naturally in all ionic lattices and furthermore, the perovskite structures described herein have at least a region of both single and double perovskite.

The value "c" is in the range of about 2 to about 3 and often about 2.5 to about 3. Typically, the value "c" is about 3. The intense conditions at which SOFCs operate means that oxygen present in the crystal structure, as well as oxygen present in the oxidant source can act as a source of oxygen ions. Typically oxygen travels from an area of higher partial pressure of oxygen to lower partial pressure of oxygen, such as from the oxidant side (air side) of the fuel cell to the reduction side (fuel side) of the fuel cell. Oxygen present in the perovskite material can be liberated from the ionic matrix in which it is bound and travel through the material. Accordingly, the amount of oxygen present in the perovskite structure is changeable and varies within the above ranges depending on reaction conditions and particular crystal compositions. Typically, the value "c" is approximately equal to 3 as this has been found to provide optimal results. This variation in oxygen content is often described as "d" or "δ", for example "$ABO_{3-d}$".

It is typically the case that x is in the range 0.2 to 0.8, or more typically, 0.3 to 0.7 or more typically still 0.4 to 0.6. In most cases, x is typically 0.5. Further, it is usually the case that y is in the range 0.1 to 0.8, or more typically 0.1 to 0.7 or more typically still 0.2 to 0.6 or even more typically 0.2 to 0.4. Typically, y is 0.3.

The inventors have found that selecting these values of x and y leads to perovskite structures with an optimal balance between oxygen ion conductance and stability. As mentioned above, variation in crystal structures is common and natural. These values are not to be construed as being precise and exact. These values are all considered to be modified by the term "about".

The ratio of single to double perovskite in the invention can be varied in order to suit a specific purpose. Typically, the weight ratio of single perovskite to double perovskite is in the range 1:9 to 9:1. More typically, the ratio of single perovskite to double perovskite is in the range 1:1 to 1:9. Often, the ratio of single perovskite to double perovskite is 2:8. It is usually the case that more double perovskite is present than single perovskite as this improves the stability of the perovskite structure, important for SOFC which are required to run under harsh conditions for longs periods of time.

Also provided in a second aspect of the invention, is an electrode for a fuel cell comprising the perovskite structure according to the first aspect of the invention. Typically, the electrode is a cathode.

There is also provided in a third aspect of the invention, a fuel cell comprising the perovskite structure according to the first aspect of the invention or an electrode according to the second aspect of the invention. Typically, the fuel cell is a solid oxide fuel cell.

There is also provided in a fourth aspect of the invention a fuel cell stack comprising one or more fuel cells according to the third aspect of the invention.

Further, the invention also provides in a fifth aspect of the invention a method of forming a perovskite structure according to the first aspect of the invention, comprising: mixing starting materials to form a mixture, wherein the starting materials comprise a first element X, strontium, iron, cobalt, oxygen and tungsten; heating the mixture to a first temperature for a first period of time to form a single perovskite; and heating the mixture to a second temperature for a second period of time to form a double perovskite; wherein the first element X is barium and/or a lanthanide (i.e., the first element X is barium, a lanthanide, or a mixture thereof).

Reference to elements such as barium, lanthanides (such as lanthanum), strontium, iron, cobalt, oxygen and tungsten as used herein is intended to refer to a material which comprises said element. This could be elemental (e.g. pure tungsten) or could be a compound comprising a range of elements including one or more of those elements described herein (e.g. $Co_3O_4$ or $CO_2$). The elements are typically provided as oxides as these are among the most common and stable forms in which the elements naturally occur.

The inventors have found that when tungsten is used in the above method, this generates a perovskite structure wherein nearly all the tungsten is incorporated into double perovskite regions. This appears to result in a particularly stable and conductive material.

In particular, the inventors have found that employing tungsten as a dopant leads to perovskite structures having a low oxygen content (high oxygen vacancy).

Typically, the first element X is barium. Those materials generated by the method using barium have been found to be particularly effective SOFC materials.

It is often the case that the method of the invention, further comprises a comminuting step prior to the heating steps. It is advantageous to reduce the starting materials to a fine particulate form so that the starting materials can be blended into a homogeneous mixture with a high surface area. This results in a more uniform perovskite structure when heated.

Whilst a variety of different comminuting methods and techniques exist, a method often used for comminuting the starting materials is ball milling. The inventors found that ball milling provides a quick and efficient method of breaking up and reducing the size of the starting materials.

After the starting materials have been comminuted, it is often the case that the comminuted starting materials are pressed to increase the compact form density prior to the heating steps. This is advantageous as it ensures air is squeezed out of any gaps in the blended mixture and improves the contact between particles. This helps to ensure that the resulting perovskite structure is free from defects, cracks and other areas of weakness. Usually, the mixture of comminuted starting materials are compressed into pellets.

The first temperature and the second temperature to which the starting materials are heated are sufficient to bring about formation of single perovskite and double perovskite respectively. The absolute temperatures at which these formations occur is dependent upon the ratio of starting materials and the particular dopants and additives that have been included in the starting material. The skilled person will be familiar with crystal classification techniques such as x-ray diffraction, neutron scattering experiments and spectroscopic techniques such as Mossbauer spectroscopy and can determine whether or not a given perovskite structure has been formed.

Typically, the first temperature is in the range 600° C.-800° C., more typically in the range 650° C.-750° C., and even more typically is approximately 700° C. These temperatures have been found by the inventors to be most effective at promoting the formation of single perovskite and which result in little to no formation of double perovskite.

Further, the second temperature is typically in the range 800° C.-1100° C., more typically in the range 850° C.-1000° C. and even more typically is approximately 900° C. These temperatures have been found by the inventors to be most effective at promoting the formation of double perovskite.

Often, the first period of time at which the starting materials are exposed to the first temperature is greater than 20 minutes, more typically greater than 1 hour. Often, the first temperature will be held for a time in the range 4 to 8 hours. The second period of time is typically greater than 20 minutes, more typically greater than 1 hour. Often, the second period of time will be in the range 1 to 10 hours and typically 6 to 10 hours.

Although not essential, the method may further comprise a sintering step at a third temperature in air for a third period of time after the second heating step. The inventors have found that this brings about an improvement in the properties of the resulting perovskite material. Specifically, a further sintering step was found by the inventors to improve the degree of crystallinity and parity of the SP/DP perovskite structure. This high crystallinity improves the stability and oxide ion conducting properties.

Typically, the third temperature is in the range 800° C.-1300° C., more typically, in the range 850° C.-1100° C. and even more typically is approximately 1000° C. Further, the third period of time over which the sintering step occurs is typically at least 20 minutes and more typically 1 hours. Often, the third period of time will be in the range 1 to 12 hours.

The inventors have found that if the starting materials are heated to very high temperatures over a period of time shorter than these periods, the resulting perovskite structure often include defects. Therefore, it is desirable to have a minimum period of time for each heating step as described, in order to allow gradual formation of the perovskite structure. There is no real disadvantage to exposing the starting materials to the heating conditions for longer periods but this does not usually bring about any great improvement in properties and it is costly to maintain high temperature conditions for almost negligible improvements in properties. The time period is also dependent to some extent on the specific temperatures used in the method. Therefore, these time periods represent a typical compromise to arrive at an optimal perovskite structure.

Furthermore, it may be the case that the method is repeated at least once. By this it is meant that once the perovskite structure has been formed, this product then is used as at least part of the starting material for the repetition and the same method is applied again. This improves the properties and homogeneity of the end perovskite structure. There is no limitation on the number of times the method can be repeated in this fashion, however it is typically 3 or 4 times. Repeating the process more than this seems to provide only incremental or negligible improvements in properties.

Unless otherwise stated each of the integers described in the invention may be used in combination with any other integer as would be understood by the person skilled in the art. Further, although all aspects of the invention preferably "comprise" the features described in relation to that aspect, it is specifically envisaged that they may "consist" or "consist essentially" of those features outlined in the claims.

EXAMPLES

Method of Manufacture

High purity $BaCO_3$, $SrCO_3$, $Co_3O_4$, $Fe_2O_3$ and $WO_3$ were used to prepare $Ba_{0.5}Sr_{0.5}(Co_xFe_y)_{1-z}W_zO_{3-\delta}$ samples. The powders were ball-milled (350 rpm overnight, Fritsch Pulverisette 7 Planetary Mill) and heated initially to 700° C. for 6 h followed by 900° C. for 8 h before ball-milling again. The resulting powders were then pressed as pellets (1.3 cm diameter) and sintered at 1200° C. for 12 h. Phase purity was determined using x-ray powder diffraction (Panalytical X-pert Pro Bragg-Brentano geometry laboratory x-ray diffractometer with Co K$\alpha$1 radiation=1.78901 Å). For the detailed structural information for $Ba_{0.5}Sr_{0.5}(Co_{0.7}Fe_{0.3})_{0.6875}W_{0.3125}O_{3-\delta}$ synchrotron x-ray diffraction data were recorded on Beamline I11 at Diamond Light Source, UK and time of flight neutron diffraction data were recorded on diffractometer HRPD at the ISIS facility, Rutherford Appleton Laboratories, UK. Structural parameters were refined by the Rietveld method with software Topas.

For the preparation of the symmetrical cells for the area specific resistance (ASR) measurements, the cathode materials were ball-milled in isopropanol overnight followed by further ball-milling with the pore-former, V-006 (Heraeus Electronic Materials) for 3 h with mass ratio between cathode material and the pore-former, 1:0.7. The suspension was then screen printed onto a sintered samarium doped ceria (SDC) electrolyte (fuel cell materials) on both sides, and dried in an oven at 100° C.; this was repeated 6 (or more) times. The cell was fired to 950° C. for 3 h, and then coated with Au paste, followed by heating to 600° C. for 1 hour to ensure bonding to the cathode surface. ASR measurements were then performed in static air by AC impedance spectroscopy (Metrohm Autolab AUT84515) in the frequency range from 0.1 to 105 Hz with perturbation of 10 mV. The impedance data were analysed using ZView software.

Material Structure and Performance

Figure 2A:
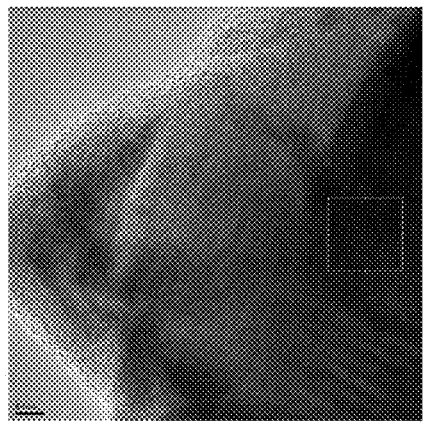
FIGS. 2a, 2b and 2c show TEM images at increasing magnification of BSCFW showing regions of the single perovskite structure.
Figure 2B:
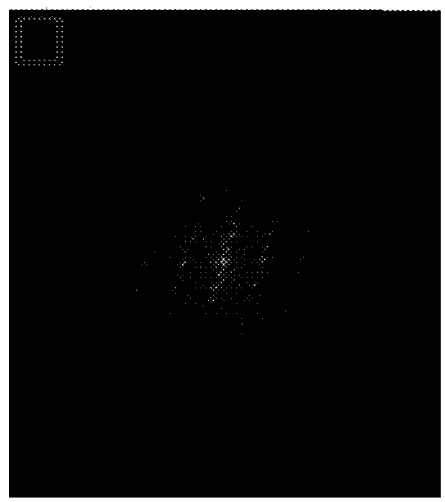
Figure 2C:
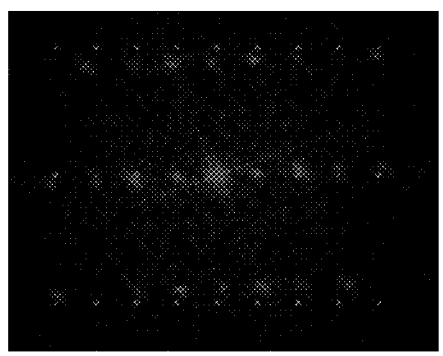
Figure 3A:
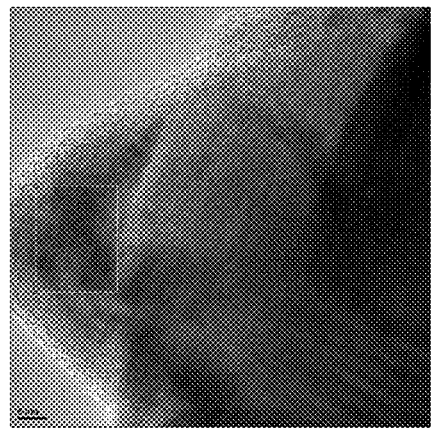
FIGS. 3a, 3b and 3c show TEM images at increasing magnification of BSCFW showing regions of the double perovskite structure.
Figure 3B:
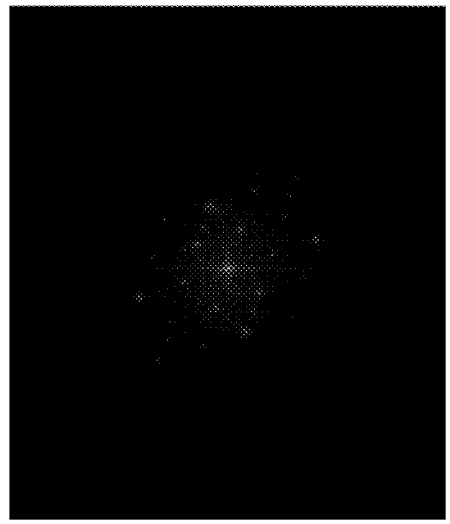
Figure 3C:
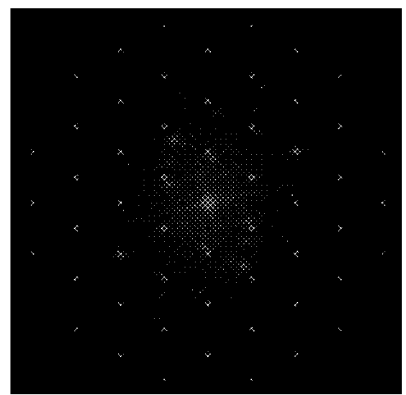
Figure 4:
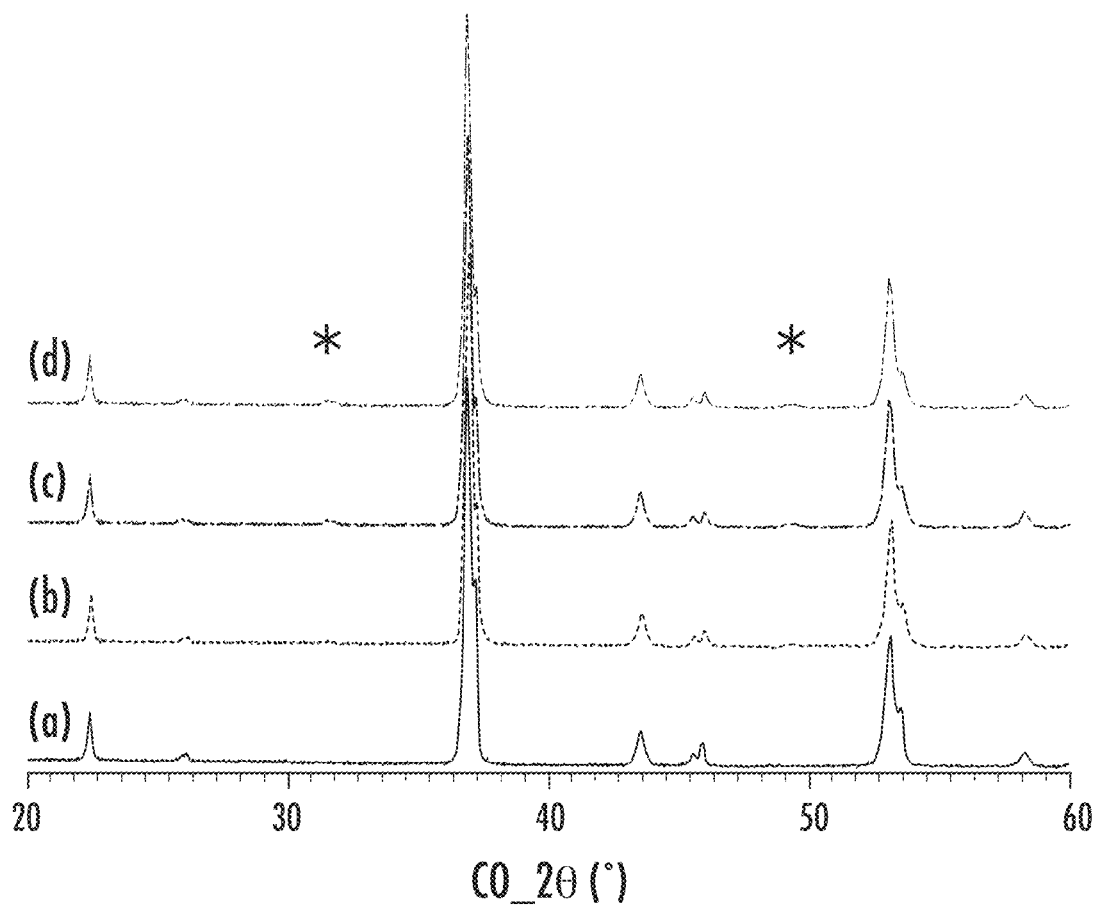
FIG. 4—demonstrates the change in structure of materials having the general chemical formula $Ba_{0.5}Sr_{0.5}(Co_{0.8}Fe_{0.2})_{0.6875}W_{0.3125}O_3$ when annealed in static air at 750° C. (a) shortly after having been made, (b) 5 days, (c) 10 days and (d) 15 days after being made (the hexagonal phase marked with *).
Figure 5:
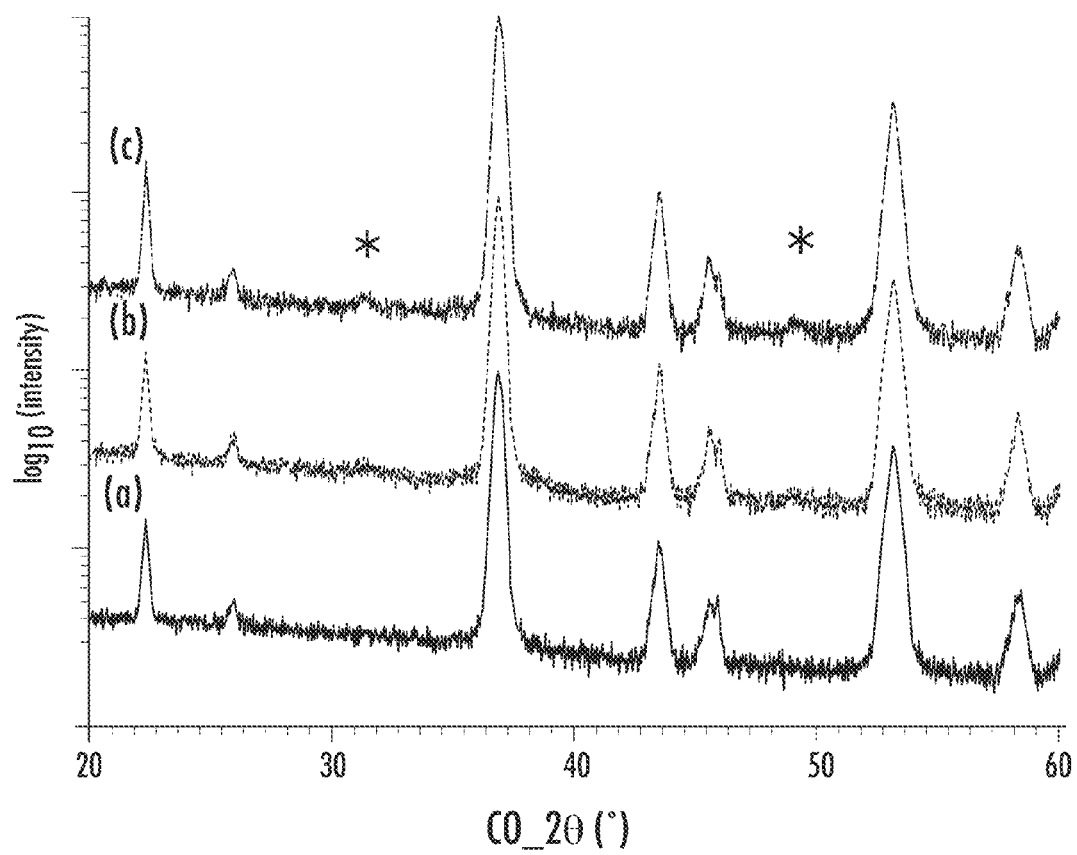
FIG. 5—shows XRD patterns for $Ba_{0.5}Sr_{0.5}(Co_{0.8}Fe_{0.2})_{0.625}W_{0.375}O_{3-d}$ ($log_{10}$ scale); (a) as prepared and annealed in static air at 750° C. for (b) 5 days, (c) 10 days which shows the gradual intensity increase of the peaks due to the hexagonal phase (marked with).

Lab x-ray diffraction patterns for all the compositions in the phase diagram (FIG. 1) showed the coexistence of single (SP) and double perovskite (DP) phases with no other impurity and TEM studies of them confirmed the endotaxial intergrowth between SP and DP (FIGS. 2 and 3). Initially, $Ba_{0.5}Sr_{0.5}(Co_{0.8}Fe_{0.2})_{1-z}W_zO_{3-d}$ series were prepared and characterised. z=0.3125 sample showed the lowest ASR (≈0.1 $\Omega cm^2$ at 600° C.) in the series but suffered from the formation of hexagonal phase when it was annealed in static air at 750° C. for 5 days and longer (FIG. 4), although it is much less significant and slower than that of BSCF. Samples with higher z values were then tried as they were expected to show better thermal stability than previous studies of molybdenum doping (see Demont, A., et al., "Single Sublattice Endotaxial Phase Separation Driven by Charge Frustration in a Complex Oxide", J. Am. Chem. Soc., 2013, 135, p. 10114-10123). At first glance, z=0.375 sample showed no sign of hexagonal phase after the thermal stability test. However, when it was annealed longer and the intensity of the patterns were viewed in logarithmic scale as shown in FIG. 5, there was a clear evidence of the crystallisation of hexagonal phase. A systematic investigation on the phase diagram away from $Ba_{0.5}Sr_{0.5}(Co_{0.8}Fe_{0.2})_{1-z}W_zO_{3-d}$ series was followed and the optimised composition in terms of cathode performance and stability has been identified as $Ba_{0.5}Sr_{0.5}(Co_{0.7}Fe_{0.3})_{1-z}W_zO_{3-\delta}$.

Figure 6:
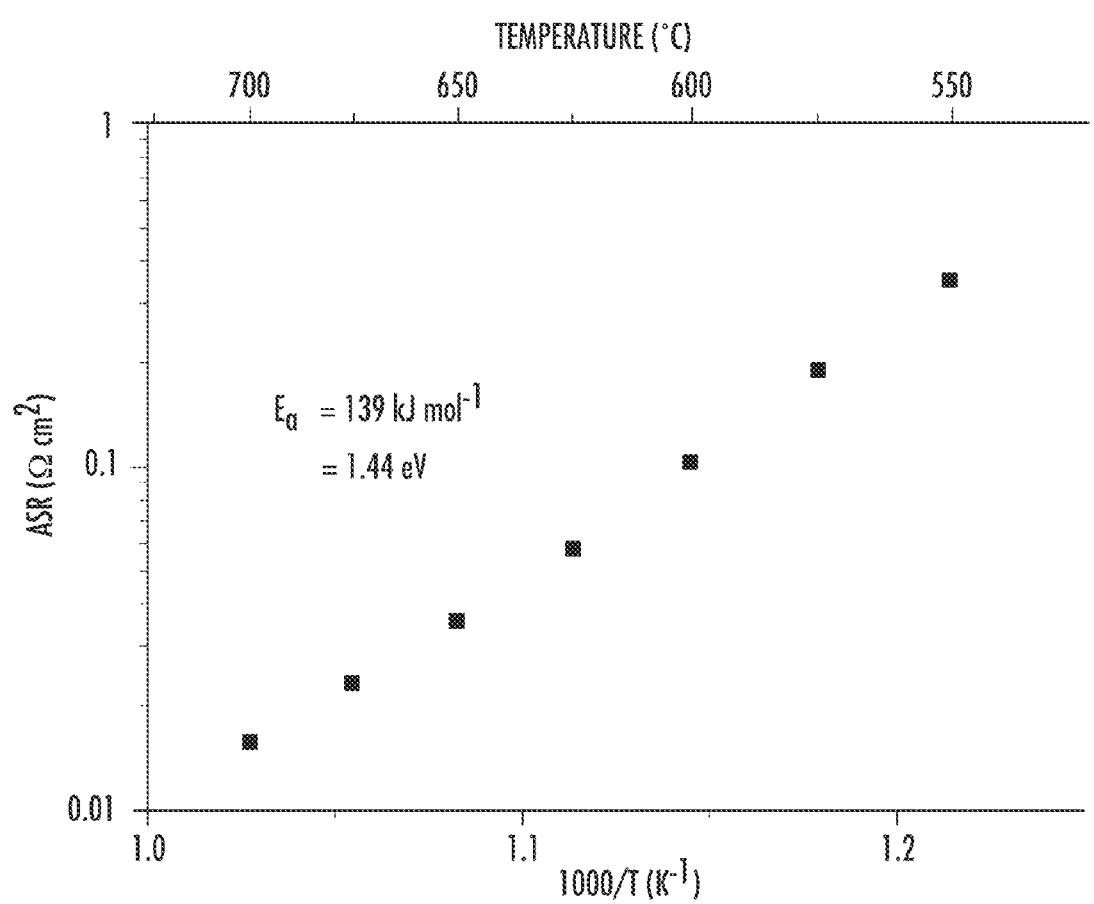
FIG. 6—shows ASR in static air over temperature for $Ba_{0.5}Sr_{0.5}(Co_{0.7}Fe_{0.3})_{0.6875}W_{0.3125}O_{3-\delta}$ having the activation energy of 139 kJ mol$^{-1}$ (=1.44 eV).

Area specific resistance (ASR) values for tungsten doped BSCF (BSCFW) are shown in FIG. 6 at 550 to 700° C. and it can clearly be seen that the values for BSCFW are approximately 3 times lower than those of the best molybdenum doped BSCF (0.034 compared to 0.13 $\Omega cm^2$ at 650° C.) and compatible with those of conventional (BSCF from 0.03 to 10 $\Omega cm^2$ at 650° C.) whilst having improved stability.

Figure 7:
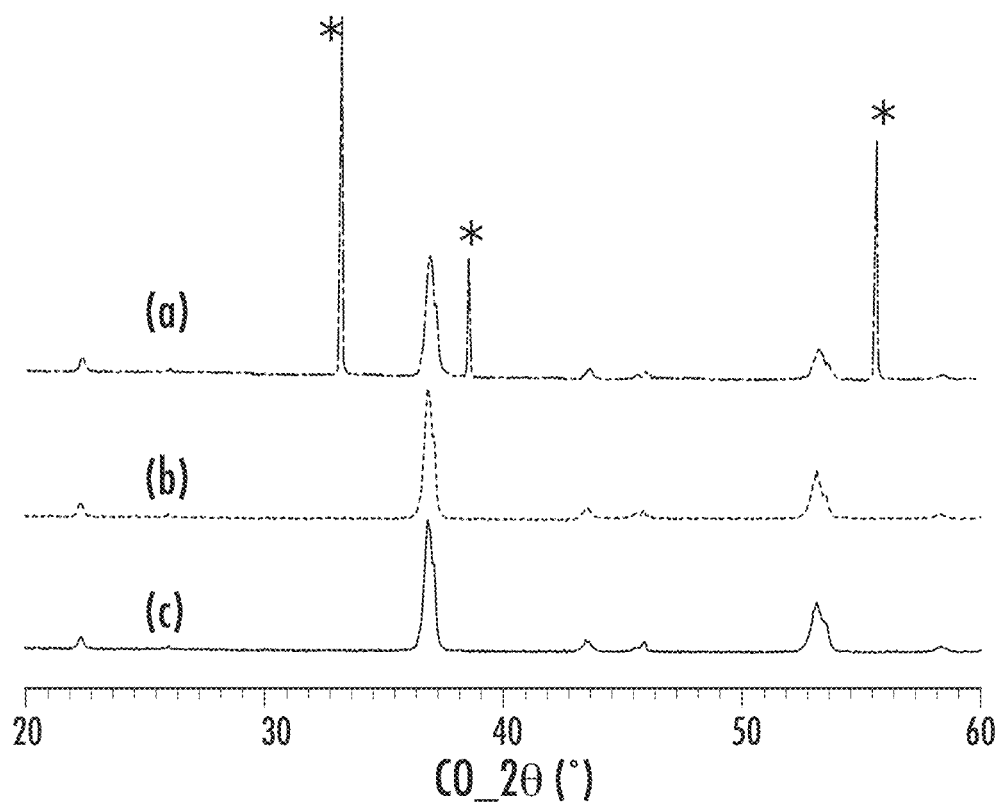
FIG. 7—shows x-ray diffraction patterns of $Ba_{0.5}Sr_{0.5}(Co_{0.7}Fe_{0.3})_{0.6875}W_{0.3125}O_{3-\delta}$ (b) before annealing, (c) after annealing for 10 days at 750° C. in static air and (a) fired with samarium doped ceria "SDS" (mass ratio 1:1) to the fabrication condition at 950° C. for 3 hours.

$Ba_{0.5}Sr_{0.5}(Co_{0.7}Fe_{0.3})_{0.6875}W_{0.3125}O_{3-\delta}$ shows the superiority over BSCF. X-ray diffraction patterns before and after annealing at 750° C. in static air and $Ba_{0.5}Sr_{0.5}(Co_{0.7}Fe_{0.3})_{0.6875}W_{0.3125}O_{3-\delta}$ and samarium doped ceria mixture (mass ratio 1:1) fired to the fabrication condition at 950° C. for 3 h are shown in FIG. 7. Single perovskite/double perovskite regions are retained for both cases showing no significant change in the diffraction patterns and no emergence of any secondary phase.

Figure 8:
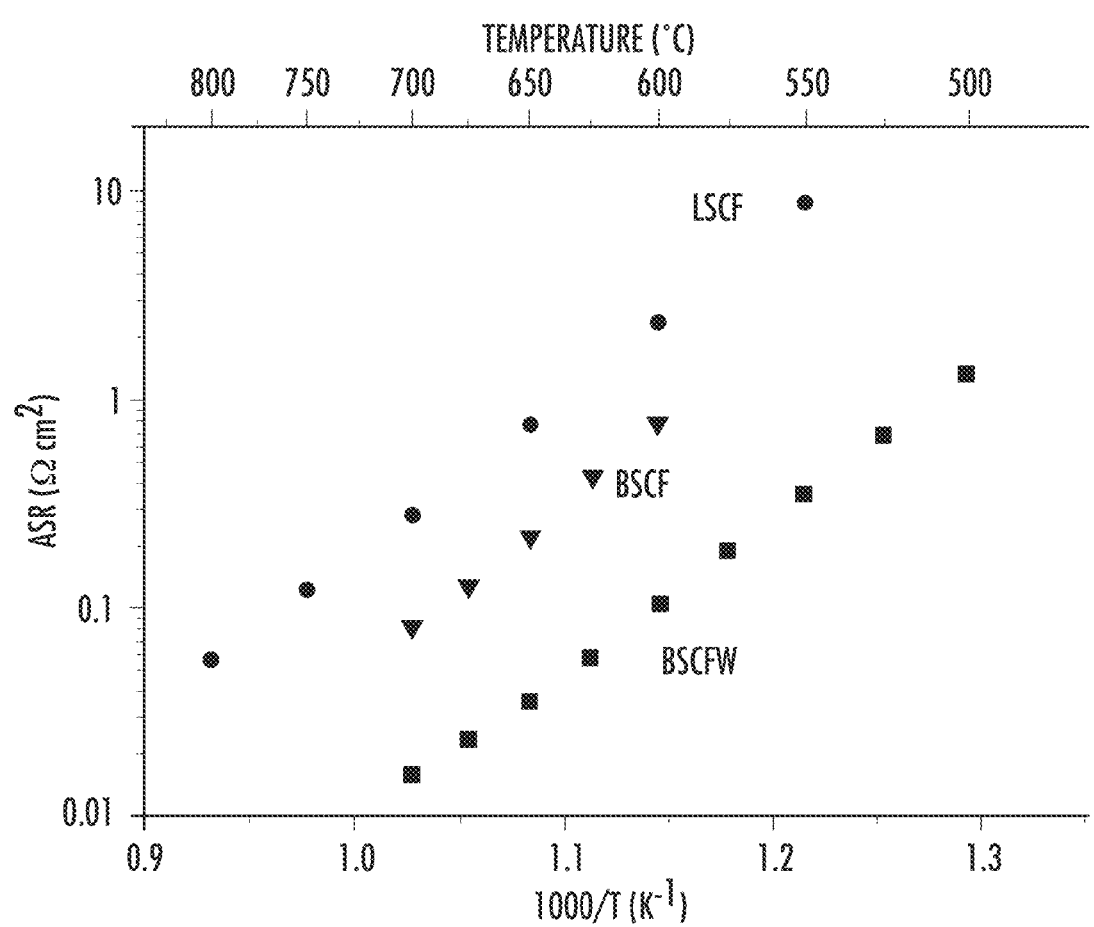
FIG. 8—shows long term continuous area specific resistance (ASR) measurements for commercially available materials (LSCF and BSCF) compared to those of the invention (BSCFW) above the temperature range.

FIG. 8 shows a comparison between conventional BSCF and LSCF against tungsten doped BSCF (BSCFW). It can be seen that the ASR values for BSCFW are approximately 3 times lower than those of the other conventional materials. This clearly indicates that, regardless of any improvement in thermal or chemical stability, BSCFW shows improved ion conductivity and/or catalytic activity to oxygen reduction reaction (ORR).

Figure 9:
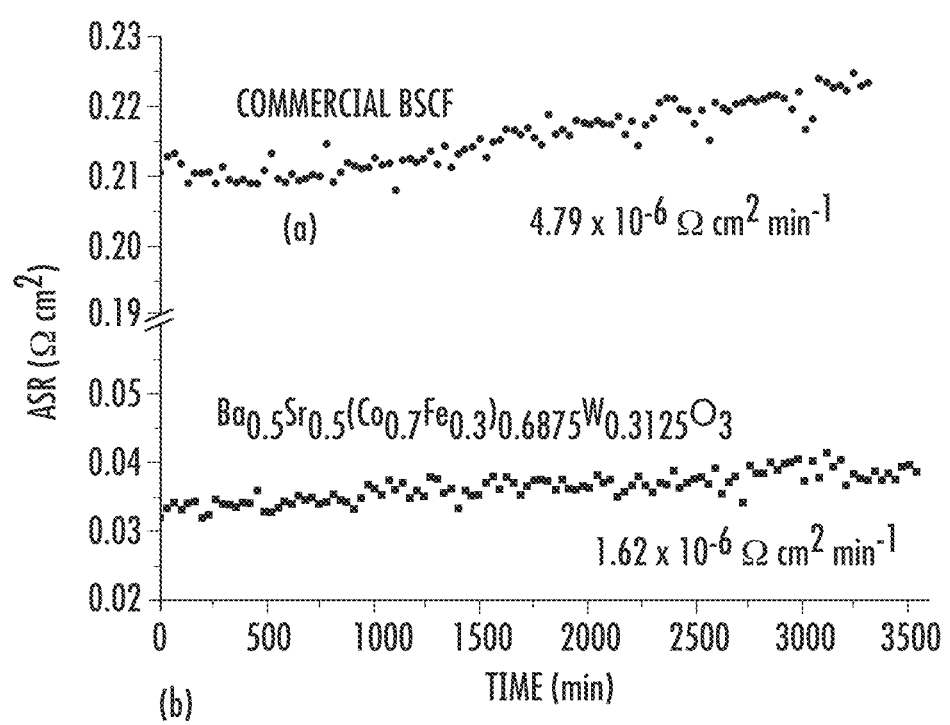
FIG. 9—shows continuous ASR data for (a) commercially available BSCF and (b) $Ba_{0.5}Sr_{0.5}(Co_{0.7}Fe_{0.3})_{0.6875}W_{0.3125}O_3$ at 650° C. in static air.

The implication of such superior stability and low ASR is exemplified in the long term continuous ASR measurement at 650° C. in static air which showed ASR values of 0.034 initially and 0.039 $\Omega cm^2$ after 60 h (FIG. 9). In direct comparison with commercial BSCF (Praxair specialty ceramics) fabricated and measured following the same protocol, $Ba_{0.5}Sr_{0.5}(Co_{0.7}Fe_{0.3})_{0.6875}W_{0.3125}O_{3-\delta}$ showed three time lower rate of performance loss. This degradation rate is very important information for the evaluation of cathode materials for SOFC applications but is not generally well documented.

Figure 10:
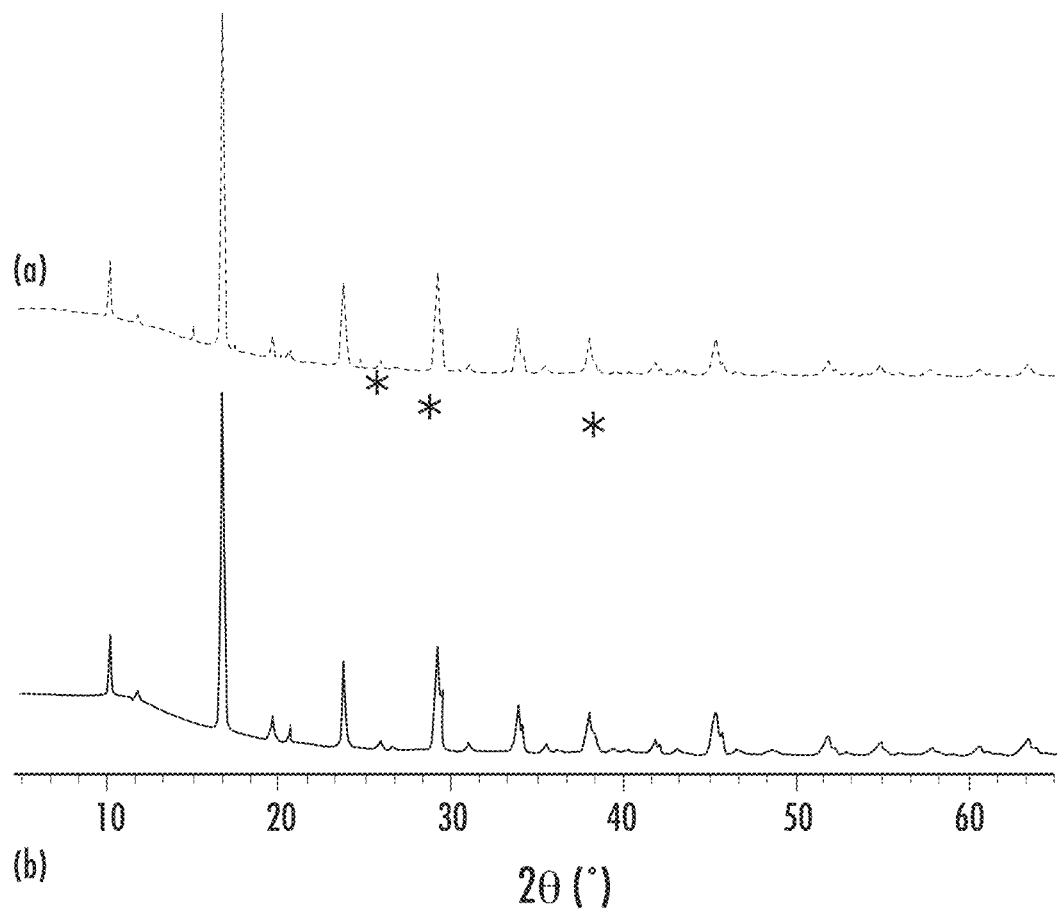
FIG. 10—shows a diffraction pattern for $Ba_{0.5}Sr_{0.5}(Co_{0.7}Fe_{0.3})_{0.6875}W_{0.3125}O_3$ taken (a) before and (b) after 60 hours of heating in static air at 650° C. SDC peaks are marked with * and A peaks with an ↓).
Figure 10A:
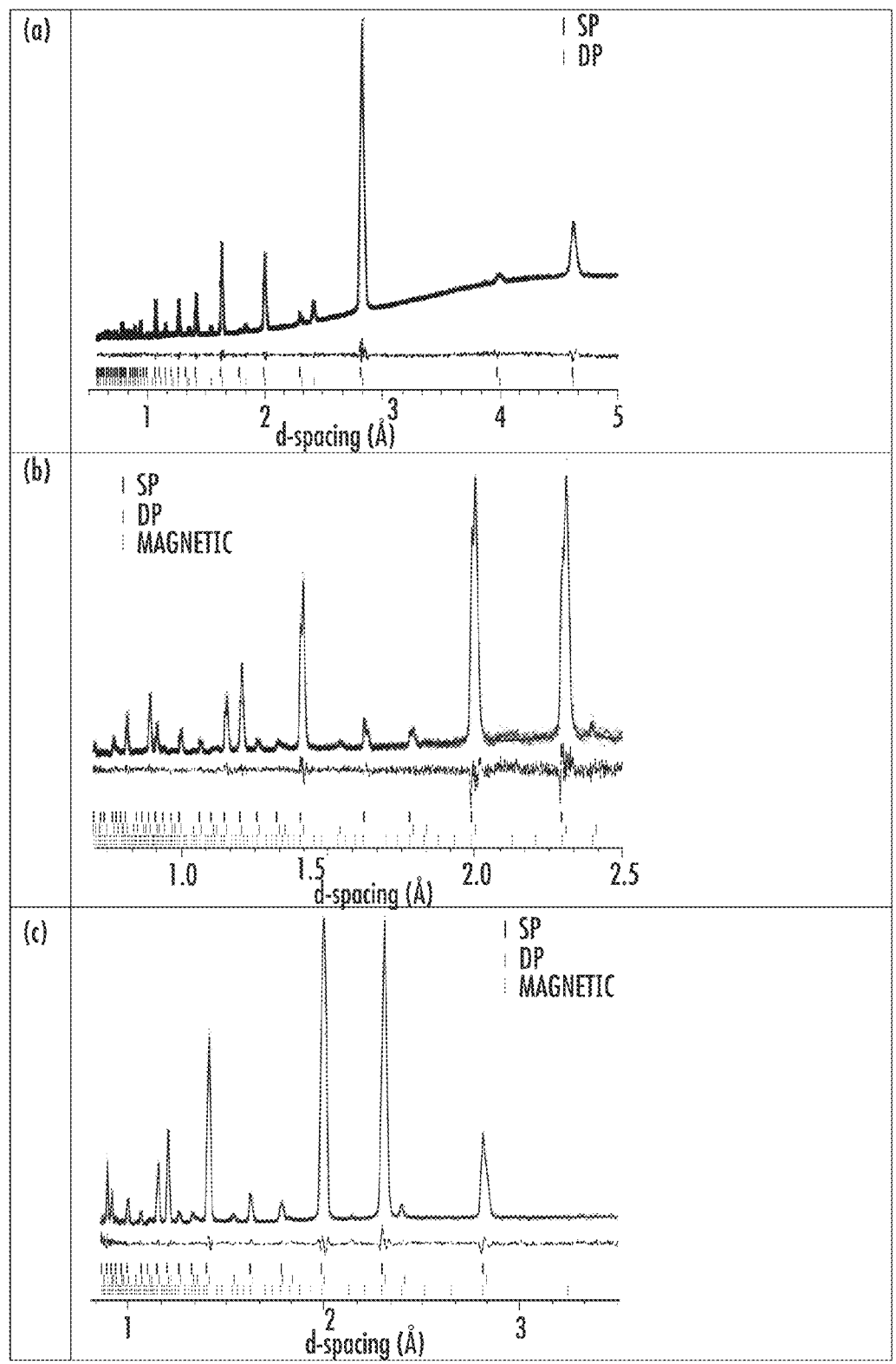
FIG. 10a—shows observed, calculated and difference profiles from Rietveld refinement of powder diffraction data of $Ba_{0.5}Sr_{0.5}(Co_{0.7}Fe_{0.3})_{0.6875}W_{0.3125}O_3$ from (a) synchrotron x-rays and time-of-flight neutron; (b) back scattering bank and (c) 90° bank. Reliability factors for the two perovskite phase model are (a) $R_{wp}$=2.72%, $R_{exp}$=2.52%, $\chi2$=1.17, $R_{bragg}$(SP)=1.27%, $R_{bragg}$(DP)=0.92%; (b) $R_{wp}$=6.47%, $R_{exp}$=5.39%, $\chi2$=1.44, $R_{bragg}$(SP)=3.89%, $R_{bragg}$(DP)=1.38%; (c) $R_{wp}$=3.56%, $R_{exp}$=2.08%, $\chi2$=2.95, $R_{bragg}$(SP)=1.80%, $R_{bragg}$(DP)=0.97%.

Furthermore, the diffraction pattern taken after the long term measurement also showed no significant change (FIG. 10), again emphasising the superior stability of $Ba_{0.5}Sr_{0.5}(Co_{0.7}Fe_{0.3})_{0.6875}W_{0.3125}O_{3-\delta}$. Table 1 shows the typical composition of the BSCFW perovskite structure including the proportion of single and double perovskite regions and the multiplicity of the crystal structures. Combined Rietveld refinement using synchrotron X-ray and time-of-flight neutron diffraction data has enlightened the crystal structures of SP and DP of $Ba_{0.5}Sr_{0.5}(Co_{0.7}Fe_{0.3})_{0.6875}W_{0.3125}O_{3-\delta}$ (FIG. 10a and table 1). The preliminary refinement result confirmed the stoichiometric oxygen content of DP and the complete disordering of A-site cations in both SP and DP, thus fractional occupancies for these atoms are fixed in the final refinement.

$Ba_{0.5}Sr_{0.5}(Co_{0.7}Fe_{0.3})_{0.6875}W_{0.3125}O_{3-\delta}$ is predominantly DP phase having 78.1(4) wt. %. Both SP and DP adopt cubic symmetry and their lattice parameters are 3.9769(1) and 8.0070(2) Å respectively giving 0.67% mismatch strain for endotaxial intergrowth. This value is about 7 times larger than that of $Ba_{0.5}Sr_{0.5}Co_{0.5}Fe_{0.125}Mo_{0.375}O_{3-\delta}$. It is believed that this greater mismatch originates from the very strong preference of W being only in DP leaving SP W-free (ionic radii of $W^{6+}$ is 0.60 Å while six coordinated low spin $Co^{3+}$ and $Fe^{3+}$ are 0.545 and 0.55 Å respectively) unlike $Ba_{0.5}Sr_{0.5}Co_{0.5}Fe_{0.125}Mo_{0.375}O_{3-\delta}$ which has small amount of Mo incorporated in SP phase. This difference also enabled the peaks of SP to be appeared in the diffraction patterns where the peaks for SP are completely eclipsed by those from DP in the diffraction patterns for $Ba_{0.5}Sr_{0.5}Co_{0.5}Fe_{0.125}Mo_{0.375}O_{3-\delta}$.

The refined composition of DP is $BaSrCo_{0.912}Fe_{0.211}W_{0.877}O_6$ and the B-site ordering is driven by the charge difference between W and Co with small amount of Fe present in both sites. It is understood that the low solubility of Fe in DP is the driving force for the phase separation while the common perovskite $AO_3$ matrix promotes the endotaxial intergrowth of SP and DP. The average oxidation states for the transition metals are 2.44, thus electronic conduction is expected from the presence of the mixed valence states as commonly seen in the electronically conducting double perovskites.

The refined composition of SP is $Ba_{0.5}Sr_{0.5}Co_{0.588}Fe_{0.412}O_{2.259}$. It is one of the homologues series of BSCF with Co:Fe≈6:4 and its cell parameter agrees well with literature values. It can be noticed that in the refinement result table that the thermal parameter for A-site cation is greater than that of oxygen. The oxygen content of 2.40(2) for SP of $Ba_{0.5}Sr_{0.5}(Co_{0.7}Fe_{0.3})_{0.6875}W_{0.3125}O_{3-\delta}$ is low and even close to the lowest oxygen content of BSCF reported despite the fact that the Co:Fe ratio of 6:4 samples should show higher oxygen content than BSCF.

Figure 11:
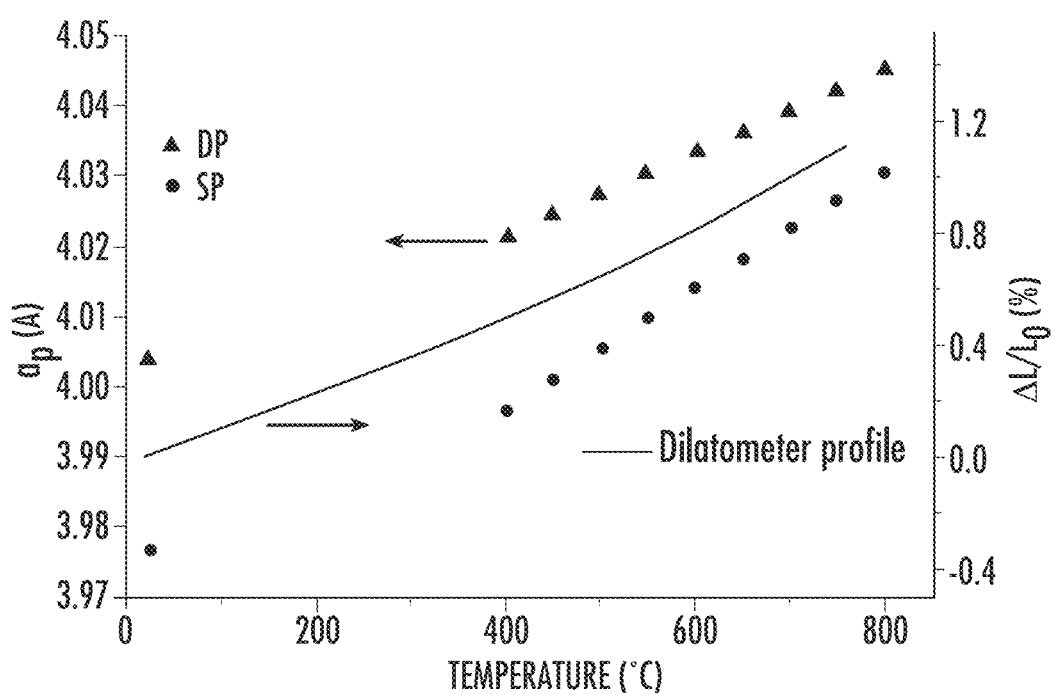
FIG. 11—shows the thermal expansion of SP(•) and DP(Δ) regions in $Ba_{0.5}Sr_{0.5}(Co_{0.7}Fe_{0.3})_{0.6875}W_{0.3125}O_3$ perovskite structures with temperature.

This low oxygen content may have been achieved by the combination of the preparation procedure and the endotaxial intergrowth of SP and DP. It is well known that BSCF exhibits high oxygen vacancy at higher temperature driven by the reduction of the transition metals. In case of W doped BSCF samples, even higher oxygen vacancy values can be accessed as the final firing temperature is 1200° C. compared to ≈950° C. for the commonly used sol-gel methods for BSCF and such high oxygen vacancies near the interface region can be locked by the strain. As evidenced in the variable temperature powder diffraction studies shown in FIG. 11, the thermal expansion of SP is greater than that of DP which means that the cell parameter match between SP and DP is better at the synthesis condition than at room temperature which is also evidenced by the mismatch strain values of 0.67 and 0.36% at room temperature and 800° C. respectively (and 0.03% at 1200° C. estimated from the extrapolation). Thus the strain induced by the greater mismatch at lower temperatures prevent the cell contraction of SP which takes place on cooling stage of the synthesis where oxidation of $(Co/Fe)^{2+}$ to $(Co/Fe)^{3+}$ and oxygen uptake occurs at the same time. This strain induced prevention of oxidation of B-site cations locks the oxygen content near the interface region at high temperature level at lower temperatures which eventually result in the very low oxygen content for the SP phase.

Figure 12:
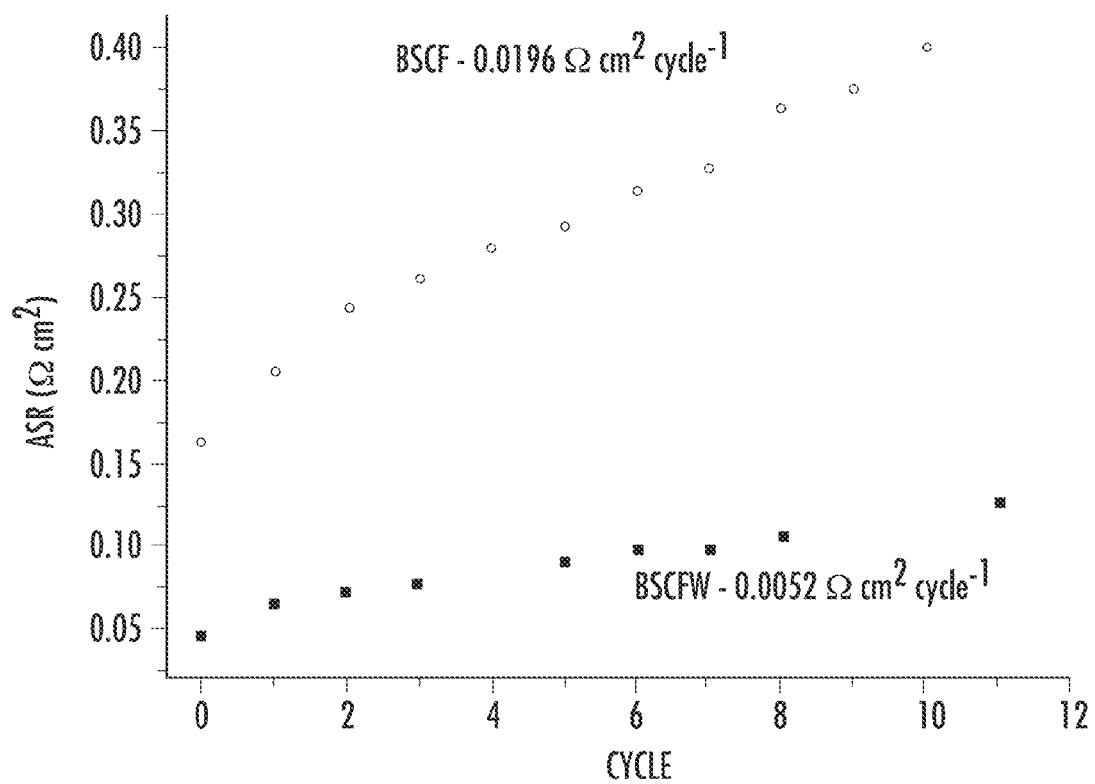
FIG. 12—shows a comparison of the stability of conventional SOFC materials (BSCF) against the $Ba_{0.5}Sr_{0.5}(Co_{0.7}Fe_{0.3})_{0.6875}W_{0.3125}O_3$ with cycles. One cycle includes heating from room temperature to 650° C., maintaining the temperature at 650° C. then cooling to room temperature and heating up again in air bubbled through water at room temperature.

FIG. 12 shows the effect of performing repeated cycles of heating and cooling on conventional materials (BSCF) and the tungsten-doped BSCF (BSCFW) of the invention in a humid atmosphere to simulate the harsh operating conditions of a commercial SOFC. Not only is the area specific resistance lower for BSCFW but it can be seen that the rate of degradation of the material is much lower (approximately four times slower). It is understood that optimising the material and processing conditions could result in greatly reduced or flat ASR over extended periods of operation.

Figure 13:
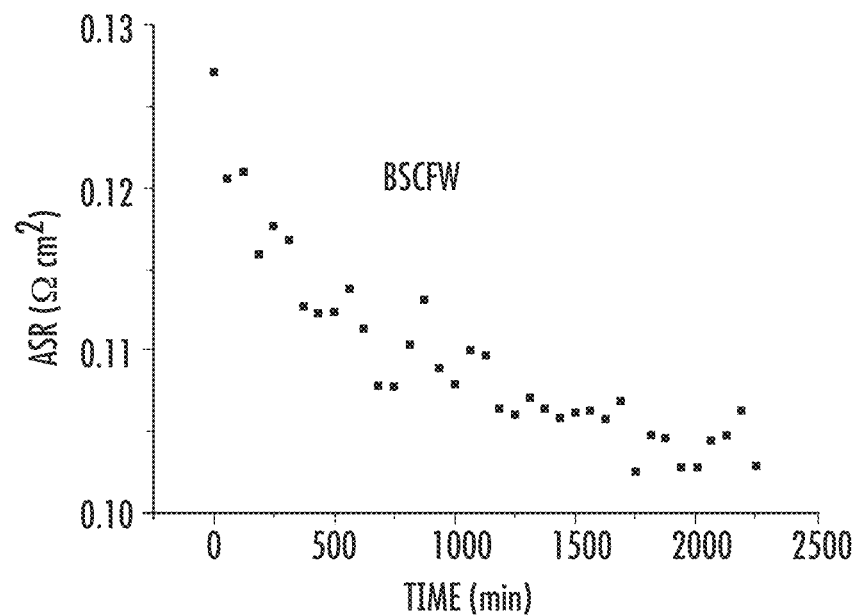
FIG. 13—shows ASR data for a $Ba_{0.5}Sr_{0.5}(Co_{0.7}Fe_{0.3})_{0.6875}W_{0.3125}O_3$ sample heated at 650° C. for 40 hours after 11 cycles had been performed on the sample.

FIG. 13 shows what happens to the area specific resistance of the BSCFW of the invention when left at 650° C. for 40 hours after the multiple cycling experiments shown in FIG. 12. A gradual reduction in the ASR is noticeable which shows that BSCFW materials are able to recover over time and return to near optimal ASR.

Figure 14:
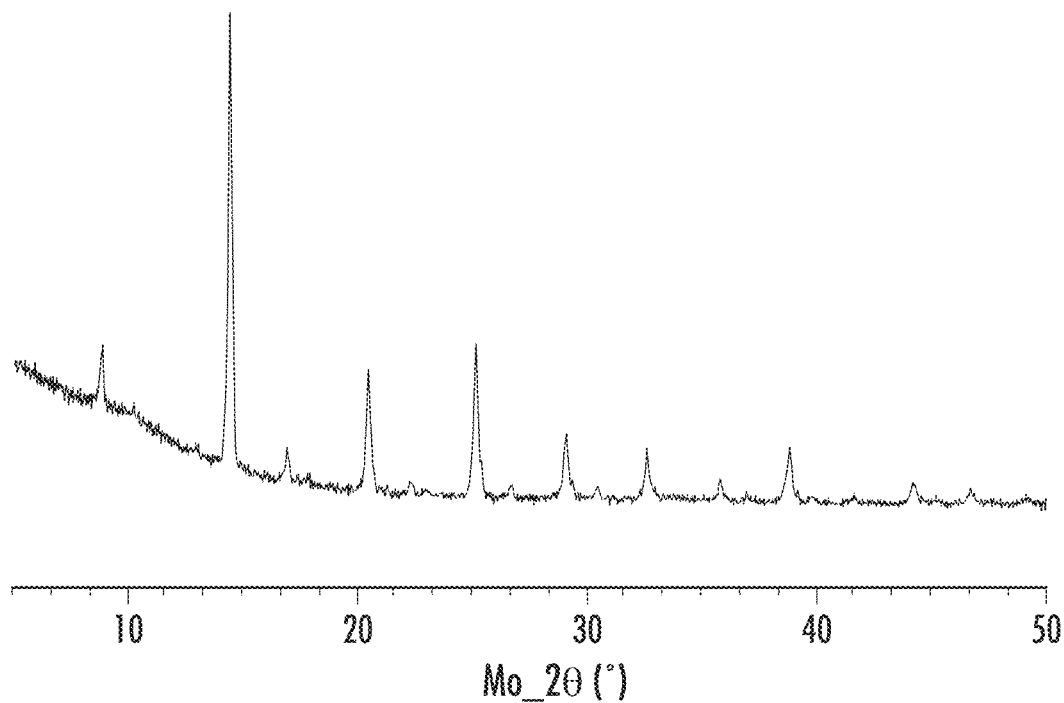
FIG. 14—shows an x-ray diffraction pattern for $Ba_{0.5}Sr_{0.5}(Co_{0.7}Fe_{0.3})_{0.6875}W_{0.3125}O_3$ after having been cycled 11 times and subsequently heated for 40 hours.

FIG. 14 shows an x-ray diffraction pattern of the BSCFW material after the cycling and recovery experiments described above have been carried out. This pattern is nearly identical to the x-ray diffraction pattern generated by newly synthesised BSCFW (with minor amounts of impurities such as gold and samarium doped ceria present). This again demonstrates the resilience of the tungsten doped BSCF.

Figure 15:
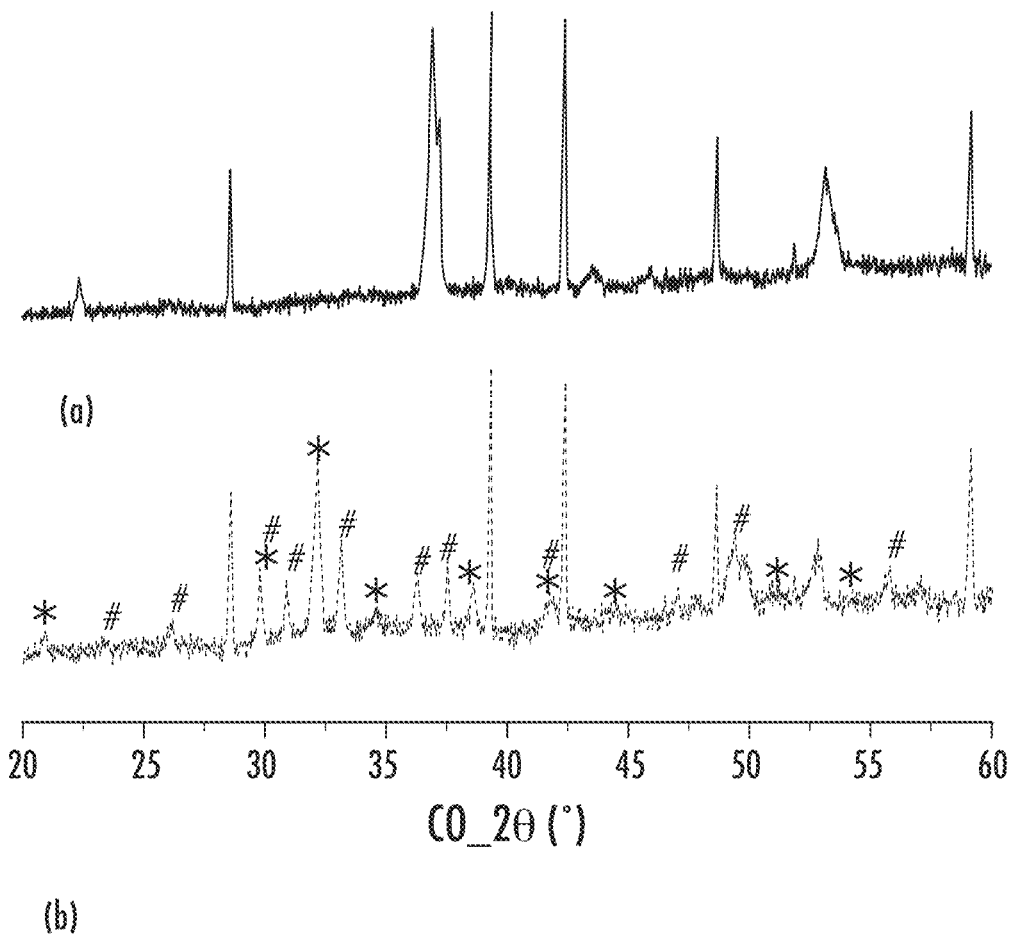
FIG. 15—shows x-ray diffraction pattern of $Ba_{0.5}Sr_{0.5}(Co_{0.7}Fe_{0.3})_{0.6875}W_{0.3125}O_3$ mixed with $Cr_2O_3$ (1:1 mass ratio) (a) before and (b) after annealing at 650° C. for 5 days.

FIG. 15 shows how BSCFW reacts with chromium oxide in 1:1 mass ratio. It appears that signals for both BSCF and BSCFW completely disappear when chromium is present after annealing at 650° C. for 5 days. Most of the peaks shown are associated with $SrCrO_4$, $BaCrO_4$ and other binary oxides.

Figure 16:
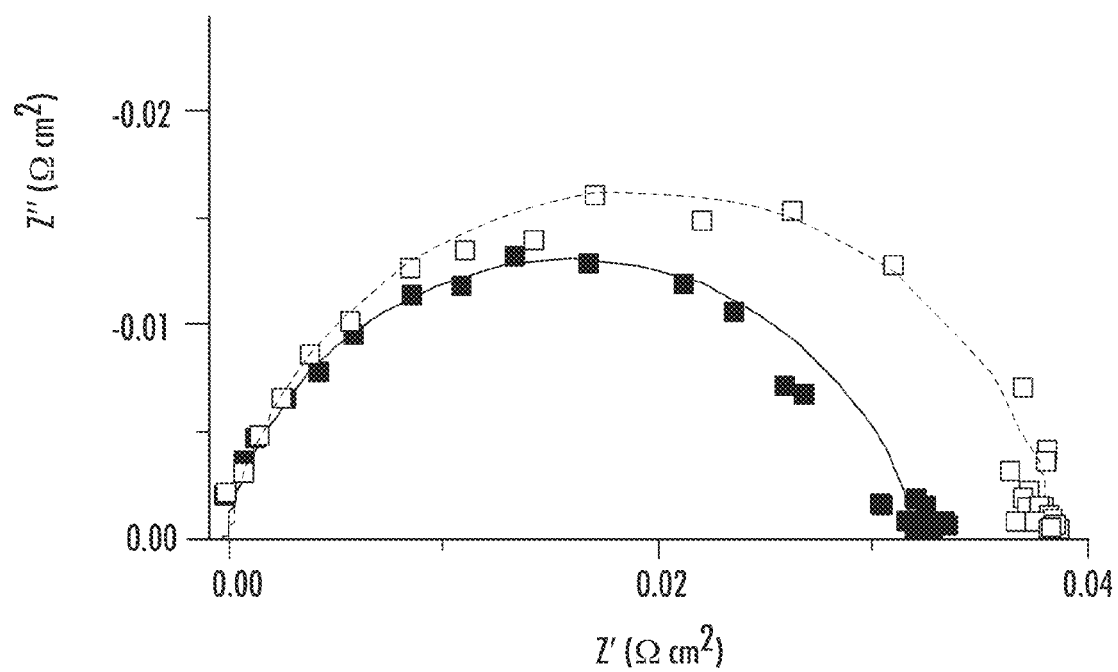
FIG. 16—shows complex impedance plots for $Ba_{0.5}Sr_{0.5}(Co_{0.7}Fe_{0.3})_{0.6875}W_{0.3125}O_3$ at the beginning (■) and at the end (□) of 60 h continuous measurement at 650° C.

FIG. 16 shows complex impedance plots for $Ba_{0.5}Sr_{0.5}(Co_{0.7}Fe_{0.3})_{0.6875}W_{0.3125}O_{3-\delta}$ both at the beginning and end of 60 hour continuous measurement at 650° C.

It should be appreciated that the structures and methods of the inventions are capable of being implemented in a variety of ways, only a few of which have been illustrated and described above.

The invention claimed is:

1. A perovskite structure comprising:
a first element X, strontium, iron, cobalt, oxygen and tungsten; wherein the first element X is barium, a lanthanide, or a mixture thereof, and wherein the structure comprises a region of single perovskite and a region of double perovskite, wherein the molar percentage of tungsten is in the range of 5 to 10%.

2. The structure according to claim 1, wherein the first element X is barium or lanthanum.

3. The structure according to claim 2, wherein the first element X is barium.

4. The structure according claim 1, wherein the structure has the chemical formula:

$$(Ba_{1-x}Sr_x)(Co_{1-y}Fe_y)_aW_bO_c$$

wherein, both x and y are independently in the range of 0.1 to 0.9;
a+b is equal to 1; and
c is in the range of 2 to 3.

5. The structure according to claim 4, wherein c is 3.

6. The structure according to claim 5, wherein x is in the range of 0.4 to 0.6.

7. The structure according to claim 5, wherein y is in the range of 0.1 to 0.4.

8. The structure according to claim 1, wherein the ratio of single perovskite to double perovskite is in the range of 1:1 to 1:9.

9. An electrode for a fuel cell comprising the structure according to claim 1, wherein the electrode is a cathode.

10. A fuel cell comprising the structure according to claim 1, wherein the fuel cell is a solid oxide fuel cell.

11. A fuel cell stack comprising one or more fuel cells according to claim 10.

12. A method of forming the perovskite structure of claim 1 comprising:
mixing starting materials, wherein the starting materials comprise a first element X, strontium, iron, cobalt, oxygen and tungsten to form a mixture;
heating the mixture to a first temperature for a first period of time to form a single perovskite; and
heating the mixture to a second temperature for a second period of time to form a double perovskite;
wherein the first element X is barium, a lanthanide, or a mixture thereof.

13. The method according to claim 12, wherein the first element X is barium.

14. The method according to claim 12, further comprising:
comminuting the mixture prior to heating to form comminuted starting materials.

15. The method according to claim 14, wherein comminuting comprises ball milling.

16. The method according to claim 14, wherein the comminuted starting materials are pressed prior to the heating steps.

17. The method according to claim 12, wherein the first temperature is in the range of 650° C. to 750° C., and wherein the second temperature is in the range of 850° C. to 1000° C.

18. The method according claim 12, wherein the first period of time is in the range of 4 to 8 hours, and wherein the second period of time is in the range of 6 to 10 hours.

19. The method according to claim 12, further comprising:
sintering the mixture at a third temperature in air for a third period of time after heating to the second temperature.

20. The method according to claim 19, wherein the third temperature is in the range of 950° C. to 1100° C., and wherein the third period of time is in the range of 8 hours to 12 hours.

21. The method according to claim 12, wherein the method is repeated at least once.

* * * * *